US008095534B1

(12) United States Patent
Alexander

(10) Patent No.: US 8,095,534 B1
(45) Date of Patent: Jan. 10, 2012

(54) SELECTION AND SHARING OF VERIFIED SEARCH RESULTS

(75) Inventor: James Alexander, Mount Kisco, NY (US)

(73) Assignee: Vizibility Inc., New York, NY (US)

( * ) Notice: Subject to any disclaimer, the term of this patent is extended or adjusted under 35 U.S.C. 154(b) by 0 days.

(21) Appl. No.: 13/110,845

(22) Filed: May 18, 2011

Related U.S. Application Data

(60) Provisional application No. 61/452,585, filed on Mar. 14, 2011.

(51) Int. Cl.
*G06F 17/30* (2006.01)

(52) U.S. Cl. .................. 707/722; 707/706; 715/205

(58) Field of Classification Search .................. None
See application file for complete search history.

(56) References Cited

U.S. PATENT DOCUMENTS

| | | |
|---|---|---|
| 5,987,232 A | 11/1999 | Tabuki |
| 6,047,327 A | 4/2000 | Tso et al. |
| 6,092,204 A | 7/2000 | Baker |
| 6,327,590 B1 | 12/2001 | Chidlovskii et al. |
| 6,484,162 B1 * | 11/2002 | Edlund et al. .......... 707/999.003 |
| 6,594,654 B1 | 7/2003 | Salam et al. |
| 6,629,104 B1 | 9/2003 | Parulski et al. |
| 6,847,649 B2 | 1/2005 | Sutanto |
| 6,970,861 B2 | 11/2005 | Messler |
| 6,990,482 B1 | 1/2006 | Piotrowski et al. |
| 7,072,888 B1 | 7/2006 | Perkins |
| 7,110,993 B2 | 9/2006 | Soulanille et al. |
| 7,353,534 B2 * | 4/2008 | Stephens .......................... 726/3 |
| 7,565,402 B2 | 7/2009 | Schneider |
| 7,680,856 B2 | 3/2010 | Qureshi |
| 7,698,442 B1 | 4/2010 | Krishnamurthy et al. |
| 7,711,738 B1 | 5/2010 | Kraft et al. |

(Continued)

FOREIGN PATENT DOCUMENTS

WO 01/75668 A2 10/2001

(Continued)

OTHER PUBLICATIONS

Ian Levine, "Google Me: Exclusive Interview with the Founder of Vizibility", Posted Jan. 21, 2010, Career Rocketeer blog, pp. 1-4, available at http://www.careerrocketeer.com/2010/01/google-me-exclusive-interview-with.html. Retrieved on Aug. 24, 2011.*

(Continued)

*Primary Examiner* — Cheryl Lewis
*Assistant Examiner* — Scott A Waldron
(74) *Attorney, Agent, or Firm* — Novak Druce & Quigg LLP

(57) ABSTRACT

Aspects of the disclosure include establishing a verified set of search results, as a selection of search results returned by a search engine, responsive to a pre-defined query. The verified set of search results are stored and associated with a URL. The URL can be distributed by an entity that establishes the definition of the query and the selection of search results. When the URL is activated, the selection of search results can be returned, with a link to the search engine that allows a redirect to the search engine, with the pre-defined query, so that a current set of search results is returned by the search engine responsive to the pre-defined query. The entity can be notified when the URL is used, and information concerning the party activating the URL can be provided to the entity.

3 Claims, 16 Drawing Sheets

U.S. PATENT DOCUMENTS

| | | |
|---|---|---|
| 7,756,868 B2 | 7/2010 | Lee |
| 7,827,170 B1 | 11/2010 | Horling et al. |
| 7,827,271 B2 | 11/2010 | Sankaran et al. |
| 7,831,609 B1 | 11/2010 | Alexander |
| 7,840,578 B2 | 11/2010 | Ha et al. |
| 7,895,225 B1 | 2/2011 | Thirumalai et al. |
| 7,899,809 B2 | 3/2011 | Lecha et al. |
| 7,908,559 B1 | 3/2011 | Denise |
| 2002/0147517 A1 | 10/2002 | Messler |
| 2003/0110161 A1 | 6/2003 | Schneider |
| 2003/0220844 A1 | 11/2003 | Marnellos et al. |
| 2004/0122807 A1 | 6/2004 | Hamilton et al. |
| 2004/0177115 A1 | 9/2004 | Hollander et al. |
| 2004/0215608 A1 | 10/2004 | Gourlay |
| 2004/0267895 A1 | 12/2004 | Lee et al. |
| 2005/0065928 A1 | 3/2005 | Mortensen et al. |
| 2005/0144158 A1 | 6/2005 | Capper et al. |
| 2006/0026147 A1 | 2/2006 | Cone et al. |
| 2007/0022111 A1* | 1/2007 | Salam et al. .............. 707/5 |
| 2007/0124445 A1 | 5/2007 | Harris et al. |
| 2008/0005275 A1 | 1/2008 | Overton et al. |
| 2008/0046410 A1 | 2/2008 | Lieb |
| 2008/0082662 A1 | 4/2008 | Dandliker et al. |
| 2008/0133584 A1 | 6/2008 | Nishino et al. |
| 2008/0134088 A1 | 6/2008 | Tse et al. |
| 2008/0168035 A1* | 7/2008 | Ross .............................. 707/3 |
| 2008/0235383 A1 | 9/2008 | Schneider |
| 2009/0083240 A1 | 3/2009 | Nolan et al. |
| 2009/0119254 A1 | 5/2009 | Cross et al. |
| 2009/0157802 A1 | 6/2009 | Kang et al. |
| 2010/0114876 A1* | 5/2010 | Mandel et al. ............... 707/722 |
| 2010/0115389 A1 | 5/2010 | Gautestad |
| 2010/0138485 A1 | 6/2010 | Chow et al. |
| 2010/0169297 A1 | 7/2010 | Haveliwala et al. |
| 2010/0217771 A1 | 8/2010 | Nash |
| 2010/0228715 A1 | 9/2010 | Lawrence |
| 2010/0241625 A1 | 9/2010 | Aravamudan et al. |
| 2010/0262612 A1 | 10/2010 | El-Saban et al. |
| 2010/0281031 A1 | 11/2010 | Voice |
| 2010/0287191 A1 | 11/2010 | Price et al. |
| 2010/0299343 A1 | 11/2010 | Ahari et al. |
| 2010/0306215 A1 | 12/2010 | Azar et al. |
| 2011/0029640 A1 | 2/2011 | Hudetz et al. |
| 2011/0040753 A1 | 2/2011 | Knight |
| 2011/0047136 A1 | 2/2011 | Dehn |
| 2011/0055190 A1 | 3/2011 | Alexander |
| 2011/0055400 A1 | 3/2011 | Alexander |
| 2011/0060732 A1 | 3/2011 | Bonneau et al. |
| 2011/0066612 A1 | 3/2011 | Resnick |
| 2011/0191314 A1* | 8/2011 | Howes et al. .............. 707/706 |

FOREIGN PATENT DOCUMENTS

| | | |
|---|---|---|
| WO | 01/75668 A3 | 10/2001 |
| WO | 01/98947 A1 | 12/2001 |
| WO | 03/081461 A1 | 10/2003 |
| WO | 2006/014439 A2 | 2/2006 |
| WO | 2006/014439 A3 | 2/2006 |
| WO | 2006/116194 A2 | 11/2006 |
| WO | 2006/116194 A3 | 11/2006 |

OTHER PUBLICATIONS

James Alexander, "Getting Vizibility", Blog entries posted Feb. 4-18, 2010, pp. 1-4, available at http://vizibility.net/blog/page/13/. Retrieved on Aug. 24, 2011.*

Viddler.com, "Gotham Startups: Vizibility", video interview uploaded on Mar. 8, 2010, 8:05 minutes in duration, available at http://www.viddler.com/explore/gothammedia/videos/35/. Last accessed on Aug. 26, 2011.*

Jun Lai and Ben Soh, "Personalized Web Search Results with Profile Comparisons," Proceedings of the Third International Conference on Information Technology and Applications (ICITA'05), 2000, IEEE Computer Society, Washington DC.

K. Takano, X. Chen, S. Kurabayashi and Y. Kiyoki, "An Adaptive Search System using Heterogeneous Document Vector Spaces," 2009 IEEE Pacific Rim Conference on Communications, Computers and Signal Processing, Issue Date: Aug. 23-26, 2009, pp. 193-198, Victoria, BC, IEEE Computer Society, Washington DC.

Raymond Y.K. Lau, "Inferential Language Modeling for Selective Web Search Personalization and Contextualization," 2010 3rd International Conference on Advanced Computer Theory and Engineering(1CACTE), 2010, pp. V1-540-544, IEEE Computer Society, Washington DC.

N. Mittal, R. Nayak, M.C. Govil and K.C. Jain, "Evaluation of a Hybrid Approach of Personalized Web Information Retrieval using the FIRE Data Set," Proceedings of the 1st Amrita ACM-W Celebration on Women in Computing in India (A2CWiC 2010), Sep. 16-17, 2010, India, ACM, New York, NY.

Elena Demidova, Xuan Zhou and Wolfgang Nejdl, "A Probabilistic Scheme for Keyword-Based Incremental Query Construction," IEEE Transactions on Knowledge and Data Engineering, TKDE-2009-11-0773, Manuscript accepted Aug 27, 2010.

Bai Rujiang and Wang Xiaoyue, "A Semantic Information Retrieval System Based on KIM," 2010 Int. Conference on E-Health Networking, Digital Ecosystems and Technologies, Apr. 17-18, 2010, Shenzhen, vol. 2, pp. 392-395. IEEE Computer Society, Washington DC.

Shailaja Venkatsubramanyan and Timothy R. Hill, "An empirical investigation into the effects of web search characteristics on decisions associated with impression formation," Information Systems Frontiers vol. 12, No. 5, pp. 579-593, published online: May 12, 2009, Springer Science + Business Media, LLC 2009.

Danushka Bollegala, Yutaka Matsuo and Mitsuru Ishizuka, "Extracting Key Phrases to Disambiguate Personal Name Queries in Web Search," Proceedings of the Workshop on How Can Computational Linguistics Improve Information Retrieval?, pp. 17-24, Sydney, Jul. 2006, 2006 Association for Computational Linguistics.

Venkatesh Ganti, Arnd Christian König and Xiao Li, "Precomputing Search Features for Fast and Accurate Query Classification," WSDM'10, Feb. 4-6, 2010, New York City, NY, pp. 61-70, ACM, New York, NY.

Michael Chau, Daniel Zeng and Hsinchun Chen, "Personalized Spiders for Web Search and Analysis," Proceedings of the 1st ACM/IEEE-CS joint conference on Digital libraries, JCDL'01, Jun. 24-28, 2001, Roanoke, VA, pp. 79-87, ACM, New York, NY.

J. Bian, X. Li, F. Li, Z. Zheng and H. Zha, "Ranking Specialization for Web Search: a Divide-and-Conquer Approach by Using Topical RankSVM," WWW '10, Proceedings of the 19th international conference on World wide web, Apr. 26-30, 2010, Raleigh, NC, pp. 131-140, ACM, New York, NY.

Yvonne Kammerer and Wolfgang Beinhauer, "Gaze-based Web Search: The Impact of Interface Design on Search Result Selection," ETRA 2010, Austin, TX, Mar. 22-24, 2010, pp. 191-194, ACM, New York, NY Paul-Alexandru Chirita, Claudiu S. Firan and Wolfgang Nejdl,"Summarizing Local Context to Personalize Global Web Search," CIKM'06, Nov. 5-11, 2006, Arlington, VA, pp. 287-296, ACM, New York, NY.

Lyndon S. Kennedy and Shih-Fu Chang, "Reranking Approach for Context-based Concept Fusion in Video Indexing and Retrieval," CIVR'07, Jul. 9-11, 2007, Amsterdam, The Netherlands, pp. 333-340, ACM, New York, NY.

A. Broder, P. Ciccolo, E. Gabrilovich, V. Josifovski, D. Metzler, L. Riedel and J. Yuan, "Online Expansion of Rare Queries for Sponsored Search," WWW 2009, Apr. 20-24, 2009, Madrid, Spain, pp. 511-520, ACM, New York, NY.

Aditya Parameswaran, Hector Garcia-Molina and Anand Rajaraman, "Towards the Web of Concepts: Extracting Concepts from Large Datasets," The 36th International Conference on Very Large Data Bases, Sep. 13-17, 2010, Singapore, Proceedings of the VLDB Endowment, vol. 3, No. 1, pp. 566-577, VLDB Endowment.

Soumen Chakrabarti, "Dynamic Personalized Pagerank in Entity Relation Graphs," WWW 2007, May 8-12, 2007, Banff, Alberta, Canada, pp. 571-580, ACM, New York, NY.

Mohammad Al Hasan, Nish Parikh, Gyanit Singh and Neel Sundaresan, "Query Suggestion for E-Commerce Sites," WSDM'11, Feb. 9-12, 2011, Hong Kong, China, pp. 765-774, ACM, New York, NY.

Alessandro Micarelli, Fabio Gasparetti, Filippo Sciarrone and Susan Gauch, "Personalized Search on the World Wide Web," P. Brusilovsky, A. Kobsa, and W. Nejdl (Eds.): The Adaptive Web, LNCS 4321, pp. 195-230, 2007, Springer-Verlag Berlin Heidelberg 2007.

* cited by examiner

FIG. 6

Inputs for Verified Results 305

Inputs for query revision 307

FIG. 7

Drop down
309

Remaining verified results & order to determine 313

Determined verified results & order
311

FIG. 8

Add content 317

Example selection of all verified results 314

Index of pages of available results 315

Verified results page selector 316

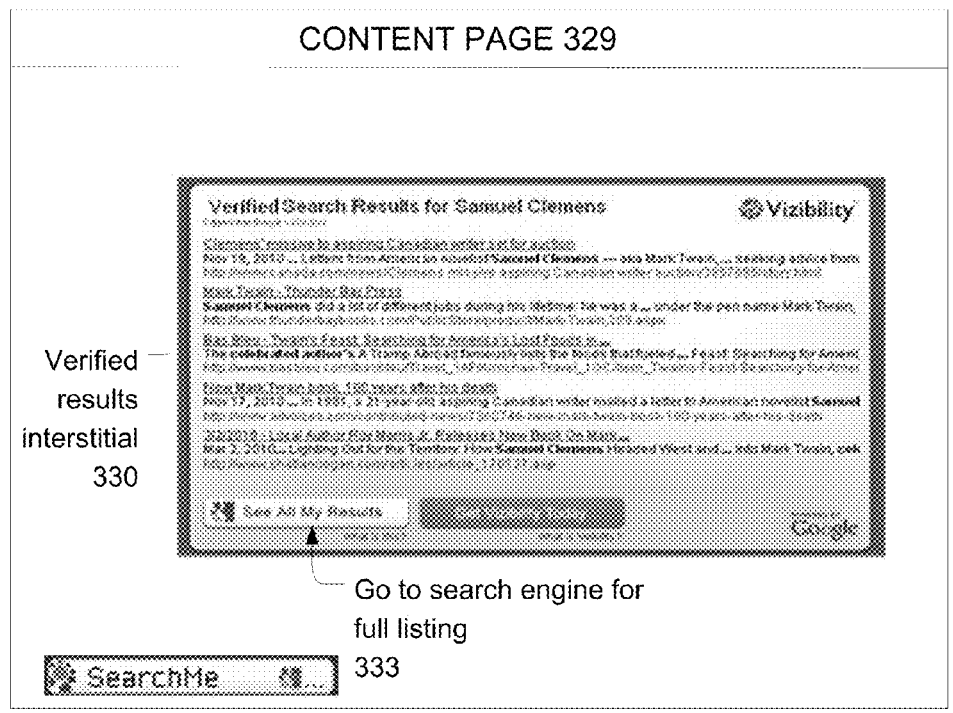
FIG. 14
FIG. 15

FIG. 20

SELECTION AND SHARING OF VERIFIED SEARCH RESULTS

CROSS-REFERENCE TO RELATED CASES

This application claims priority from U.S. Provisional App. No. 61/452,585, filed on Mar. 14, 2011, entitled "SELECTION AND SHARING OF VERIFIED SEARCH RESULTS", the contents of which are incorporated by reference in their entirety herein.

BACKGROUND

1. Field:

Aspects disclosed herein relate to information searching, and more particularly to aiding potential subjects of searches (e.g., a person) to have more control over information returned about that subject (e.g., a particular person), as described below.

2. Related Art

Internet users experience increasing difficulty navigating online information and document collections, as the amount of such information available increases. Likewise, companies, individuals and other organizations wishing to be found by Internet users face growing challenges with maintaining their online visibility. For example, it is estimated that the World Wide Web on the Internet includes more than 11 billion pages in the publicly indexable Web across more than 110 million web sites. Consequently, finding desired information in such a large collection, unless the identity, location, or characteristics of a specific document or search target are well known, can be much like looking for a needle in a haystack. The World Wide Web is a loosely interlinked collection of documents (mostly text and images) located on servers distributed over the Internet. Generally speaking, each document has an address, or Uniform Resource Locator (URL), in the exemplary form "http://www.server.net/directory/file.html". In that notation, the "http:" specifies the protocol by which the document is to be delivered, in this case the "HyperText Transport Protocol." The "www.server.net" specifies the name of a computer, or server, on which the document resides; "directory" refers to a directory or folder on the server in which the document resides; and "file.html" specifies the name of the file. URLs can be extremely long, complex strings of machine readable code.

Most documents on the Web are in HTML (HyperText Markup Language) format, which allows for formatting to be applied to the document, external content (such as images and other multimedia data types) to be introduced within the document, and "hotlinks" or "links" to other documents to be placed within the document, among other things. "Hotlinking" allows a user to navigate between documents on the Web simply by selecting an item of interest within a page. For example, a Web page about reprographic technology might have a hotlink to the Xerox corporate web site. By selecting the hotlink (often by clicking a marked word, image, or area with a pointing device, such as a mouse), the user's Web browser is instructed to follow the hotlink (usually via a URL, frequently invisible to the user, associated with the hotlink) and read a different document. A user cannot be expected to know or remember a URL for each and every document on the Internet, or even URLs for those documents in a smaller collection of preferred documents.

Accordingly, navigation assistance is not only helpful, but important for practical internet usage. Such navigation assistance is typically providing via an Internet based search engine, such as Google®, Microsoft's Bing®, Yahoo!® or the like. Accordingly, when an Internet user desires to find information about a company, individual or organization, the Internet user will frequently turn to a "search engine" to locate the information. A search engine serves as an index into the content stored on the Internet. It has become increasingly common for third parties to try to learn more about an entity (e.g., a person, company, organization, etc.; hereinafter, the example of a person as the entity is used for clarity) by searching for publicly available information about that entity using such search engines.

Regardless of how a particular search engine determines what results to return in response to a particular search, Internet users searching for companies, individuals or organizations with similar characteristics (i.e. name, industry, etc.) often receive search results that are inaccurate, or relate to entities other than the intended search target. For example, a search for "John Smith", with the intention of obtaining information about a particular person by that name, will return many results about different "John Smith's", such that the desired John Smith may not have any relevant results. In these instances, the Internet user may build more complex search queries to generate more relevant results, which is only possible if the searcher possesses information that can be used as a basis for such queries.

It is understood and well documented that it is desirable for companies, individuals and organizations to appear early in search results for personal, financial and other reasons. Prominence in search results for a given term or terms in search engines is a form of third party validation, at least in that Internet users place a higher value on entries in top search results because of their perceived relevance, success, and size. Therefore, viewership of search results or click throughs for search results on subsequent results pages declines precipitously.

Search Engine Optimization (SEO) has emerged as a category of services available to operators of web sites. SEO provides for deliberately engineering prominent placement in search results by tailoring web sites to the algorithms employed by a given search engine. In addition to SEO, 'paid search' may be utilized to display an advertisement on the top pages of search results for a given search term(s). SEO, paid search and other optimization strategies are typically only engaged by organizations due to their complexity and cost. Individuals have fewer options to achieve optimal placement in search results.

Google Profiles is one example of a mechanism individuals can utilize to offer information specific to themselves. Google Profiles does not influence search results, however, and individuals with even slightly common names often find themselves in a long list with others, eliminating the value of the feature. SEO, paid search, Google Profiles, and other similar optimization strategies are reactive in that they only influence but do not control what is returned in search results. These strategies are necessary because the natural search behavior of Internet users favors implementation of less sophisticated search queries or the Internet user simply does not possess the information necessary to build a complex search query that will allow the return of appropriately focused results. When companies, individuals or organizations with similar characteristics engage like optimization strategies, however, the differentiation gained from them diminishes and the value declines for them and also for those seeking information on such search targets.

BRIEF DESCRIPTION OF THE DRAWINGS

FIG. 6 depicts an example interface listing search results, and user interface elements for inputting selection of verified results, as well as inputs for revision of the query that caused return of the listing of search results;

FIG. 7 depicts a drop down menu, from which a relative ordering of a search result to be selected as a verified search result can be made;

FIG. 8 depicts the drop down where the first and second verified results positions have been filled, leaving the remainder of a determined number of available positions;

FIGS. 14 and 15 depict examples of how verified results can be displayed in a browser or application running on a device that requested a resource identified by a URL, according to these examples;

FIGS. 21-23 depict content screens and interface elements that can be rendered in the performance of the method of FIG. 24.

DETAILED DESCRIPTION

In a previous application now issued as U.S. Pat. No. 7,831,609, an approach to assisting targets of searches to gain more visibility in Internet searches was described. In one aspect of such approach, a query formation tool assists a user through a query formulation process, the result of which is a query to be submitted to one or more search engines. The query formulation process helps a user tailor the query so that desired search results are maintained, while others are excluded. Results to be excluded may not be applicable to the user being assisted with the query, for example. As such, excluding those results helps more relevant results be featured more prominently in search results returned using that query. The query can be directly referenced by a short URL, which can also be embedded in a button, graphic, quick response (QR) code, and so on. The user can provide the short URL, QR code, etc. on web sites, social networking sites, business cards, and the like. When the short URL is used by a searcher, the short URL can cause a redirect to the search engine, and submission of that query to the search engine, so that the search engine returns results of the query to the searcher.

Another approach to assisting searchers in identifying relevant, trusted, or otherwise verified search results about a particular search target (e.g., a person) is to provide a user with the capability of selecting search results from a set of search results provided by a search engine, in response to a query such as the one described above. A short URL or other link can be provided to the user, and the user can provide that URL to potential searchers. When a searcher activates the URL, the searcher is presented with a list of those verified search results. The verified search results can be in an order specified by the user, such that an ordering of the search results can be different from the order in which the search engine presented those results. Results presented by the search engine can be absent from the verified results; for example, because the user deemed them less relevant. Additionally, the user can be presented with an option to include a search result directed to a particular resource, which the search engine did not identify; that search result also will be presented with the others. The following disclosure includes aspects relating to an example implementation of such a system, and other related topics.

Figure 1:
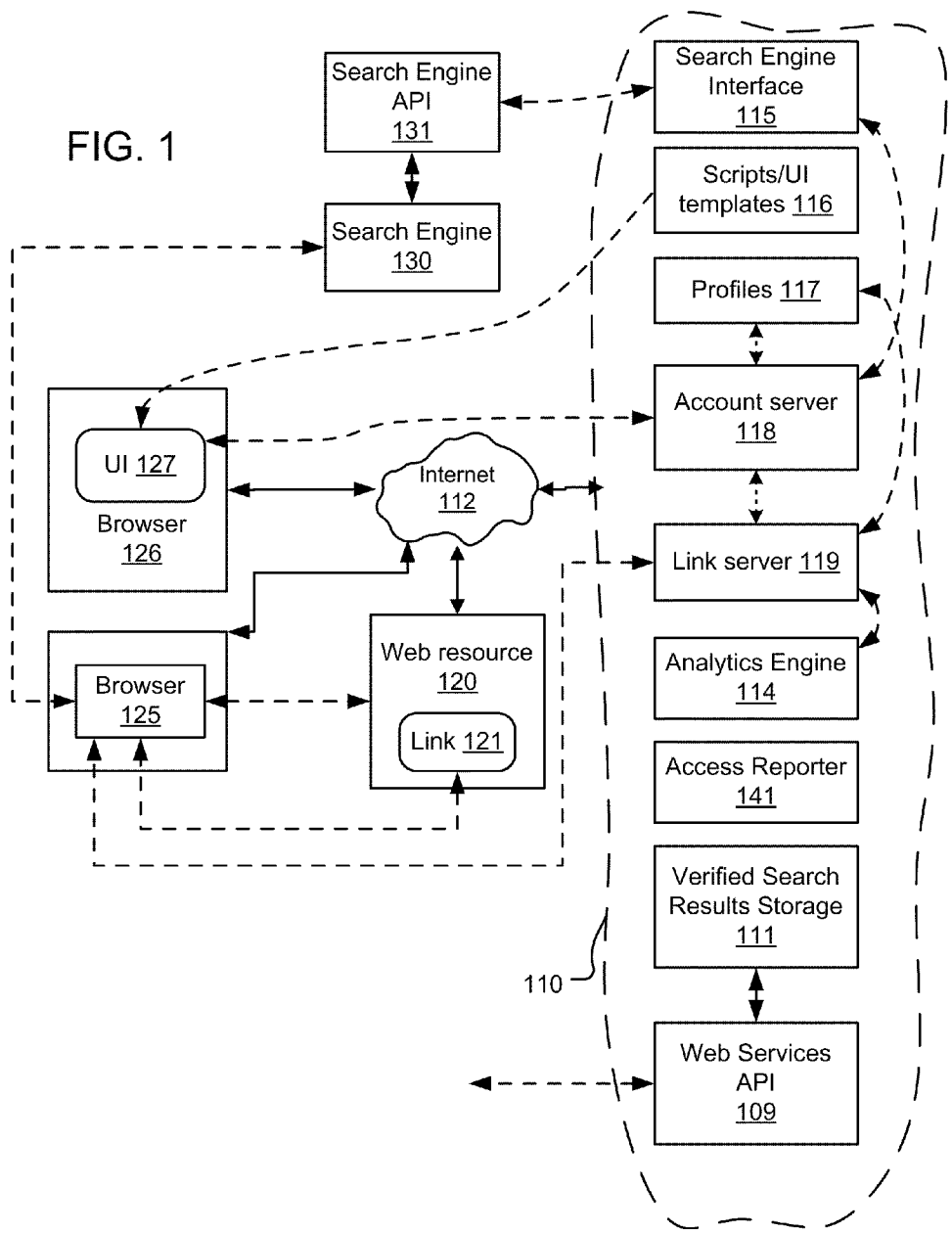
FIG. 1 depicts a system for assisting in pre-defined query and verified results selection, in a context including devices and software that may be accessed or may access such system.

FIG. 1 depicts components of an internet-based example of a system in which aspects described herein can be practiced. In FIG. 1, solid lines generally indicate a defined network connection (e.g., depicting servers and storage facilities communicating over a trusted internetwork), while dashed lines indicate a logical flow of communication, as will be described below. More particularly, FIG. 1 depicts an internet 112 (e.g., the Internet), through which a variety of components, described below, may communicate with each other. One functional grouping of components is search query provider 110.

Search query provider 110 can be used by an entity (e.g., a person) to obtain a definition of a search query. A link or reference to the obtained query definition can be distributed to third parties, for use in obtaining information about a particular subject (e.g., the person who created the pre-defined query, an organization, object, place, concept, product, service, event, or the like). In other words, the query is defined by a process performed prior to distribution of the query (or references to the query) for use in searching. Typically, the query is defined with a view to tailoring the results that are returned from the query to a desired subject, as will be described below, such subjects can include a person, a group, an organization, a business, for example, and not by way of limitation.

Returning to search query provider 110, an example composition of search query provider 110 includes a search engine interface 115, which interfaces with one or more search engines (a search engine 130 is depicted), such as through respective Application Programming Interfaces (APIs) provided by the search engines (an API 131 for search engine 130 is depicted). Search query provider 110 also has a store of scripts (e.g., javascripts) and UI templates 116, which as will be described below are for use in configuring a UI 127 located at a browser 126, which is used (in this example) for creating a pre-search query (such scripts also can be run on other devices, such as on server resources). An account creation server 118 also is provided for interfacing with UI 127, and includes information gathering functionality that can be implemented through UI 127.

A link server 119 is provided to accept requests for a resource identified by a link (e.g., a link 121 made available on a web resource 120), which can be selected or otherwise activated by a browser 125, which is accessing web resource 120. An analytics engine 114 communicates with link server 119, and operates to obtain and analyze information available from such linking activities. In a particular example, a presearch query can be referenced by link 121, such that when link 121 is activated (e.g., by clicking on a visual depiction of the link, in a page served by web resource 120 to browser 125), information about browser 125, and a device on which it is running can be obtained.

As will be described further below, various constituent elements of search query provider 110 communicate with each other, in order to perform query definition steps and/or selection of verified results steps delineated in the examples that follow. For example, account creation server 118 can store profile information in profile storage (profiles 117). Also, account creation server 118 can update link information on link server 119 (e.g., to publish a new link that can be used or otherwise distributed). Similarly, account creation server 118 may communicate with search engine interface 115 for providing trial queries to be submitted to search engine 130, and to receive results returned responsive to those queries. Browsers 125 and 126 may be implemented using Internet browsers, such as Internet Explorer, Firefox, Opera, Safari or browsers provided on mobile phones, smart phones, PDAs, or other Internet-connected appliances.

The scripts/UI templates stored in 116 or otherwise implementing a portion of search query provider 110 also can be used to implement other user interface aspects relating to selection of verified results, saving those results, and serving them responsive to resource requests made through URLs linked to those saved results. Such verified results can be stored in verified results search results storage 111.

Figure 2:
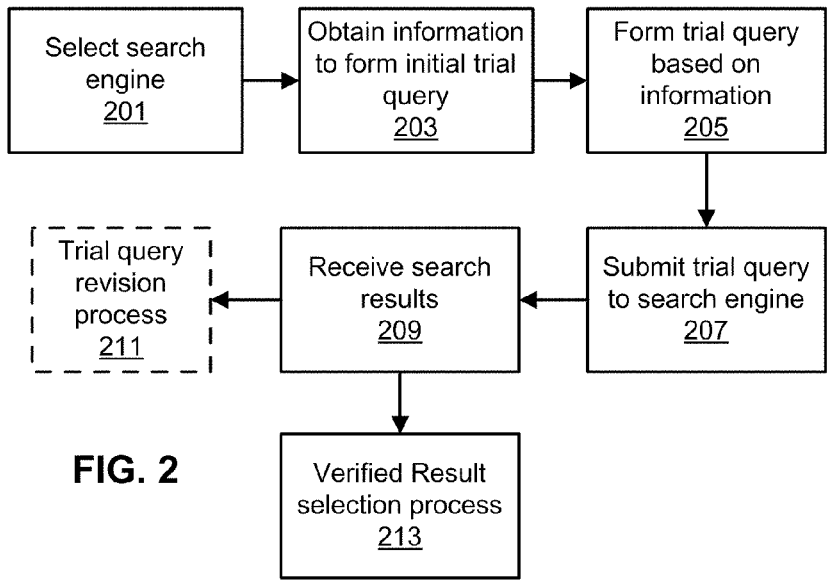
FIG. 2 depicts a process in which a pre-defined query can be created, and verified results selected, from results returned by a search engine, responsive to a given query.

FIG. 2 depicts an overview of an example process flow which can include aspects of query definition, as well as verified search results selection. FIG. 2 depicts that such a process flow can include providing for selection (201) of a search engine, obtaining (203) information to form an initial trial query, forming (205) a trial query based on the information, submitting the trial query to a search engine (207), and receiving (209) search results. After receiving search results, a trial query revision process (211) and/or a verified result selection process (213) can be performed. Briefly, query revision process (211) can be an iterative process in which a user is prompted to provide further information to cause the search engine to provide more accurate results, or exclude certain results. For example, a structured interface can prompt for keywords that are to be present, or that are to be excluded from search results; URLs can be excluded, by way of further example. Through these iterations, a user is aided to define a query that is expected to cause a search engine to return results considered relevant by the user defining/redefining the query. An example implementation of such a query revision process can be found in U.S. Pat. No. 7,831,609; the contents of which is incorporated by reference herein in its entirety.

Figure 3:
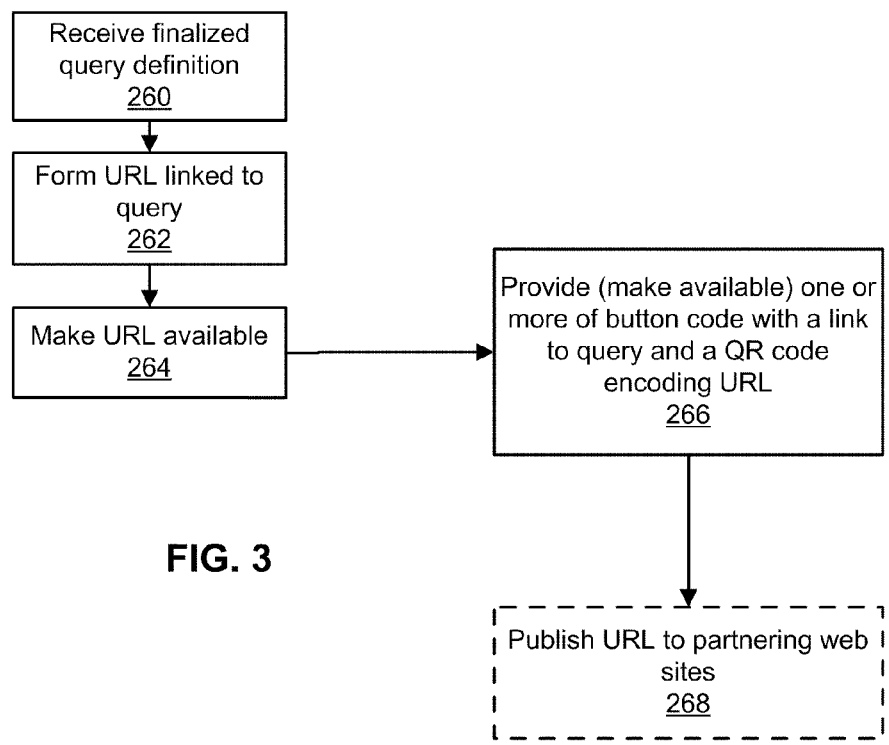
FIG. 3 depicts an example process of associating a query with a URL.

FIG. 3 depicts a process that can be used to publish or otherwise finalize a query definition process. FIG. 3 depicts that such a process comprises receiving (260) a finalized query definition, and forming (262) a URL linked to the query. The URL is made (264) available, such as through an interface to the user. The process also may include providing (266) button code, quick response (QR) code, etc. that includes the link or URL to the query, and publishing (268) the URL to other web sites (such as through a web services interface). Search results returned for the query can be stored, such stored search results can be used to detect changes to the search results over time, and for other purposes described below.

Figure 4:
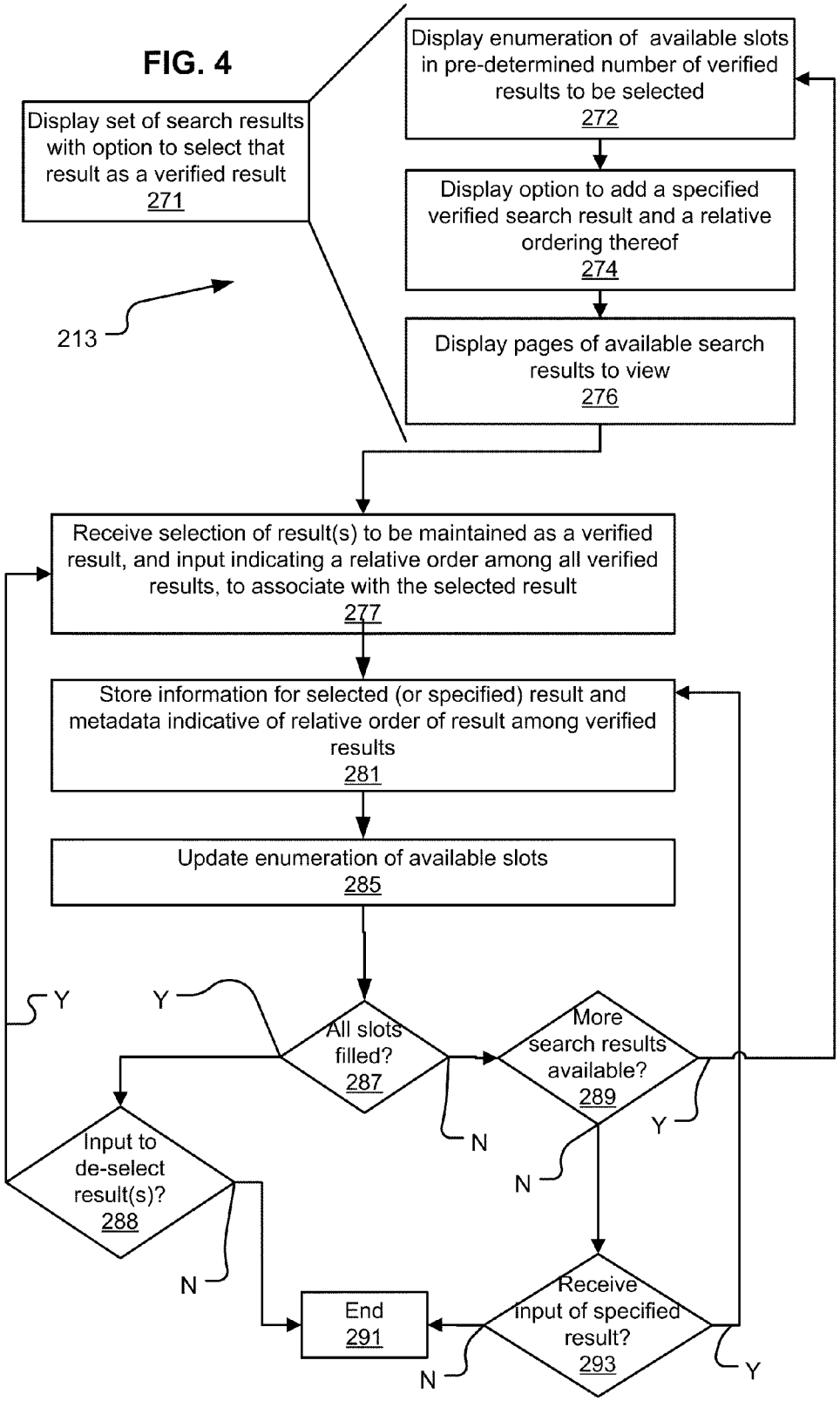
FIG. 4 depicts an example process for selecting verified search results, from a set of search results.
Figure 5:
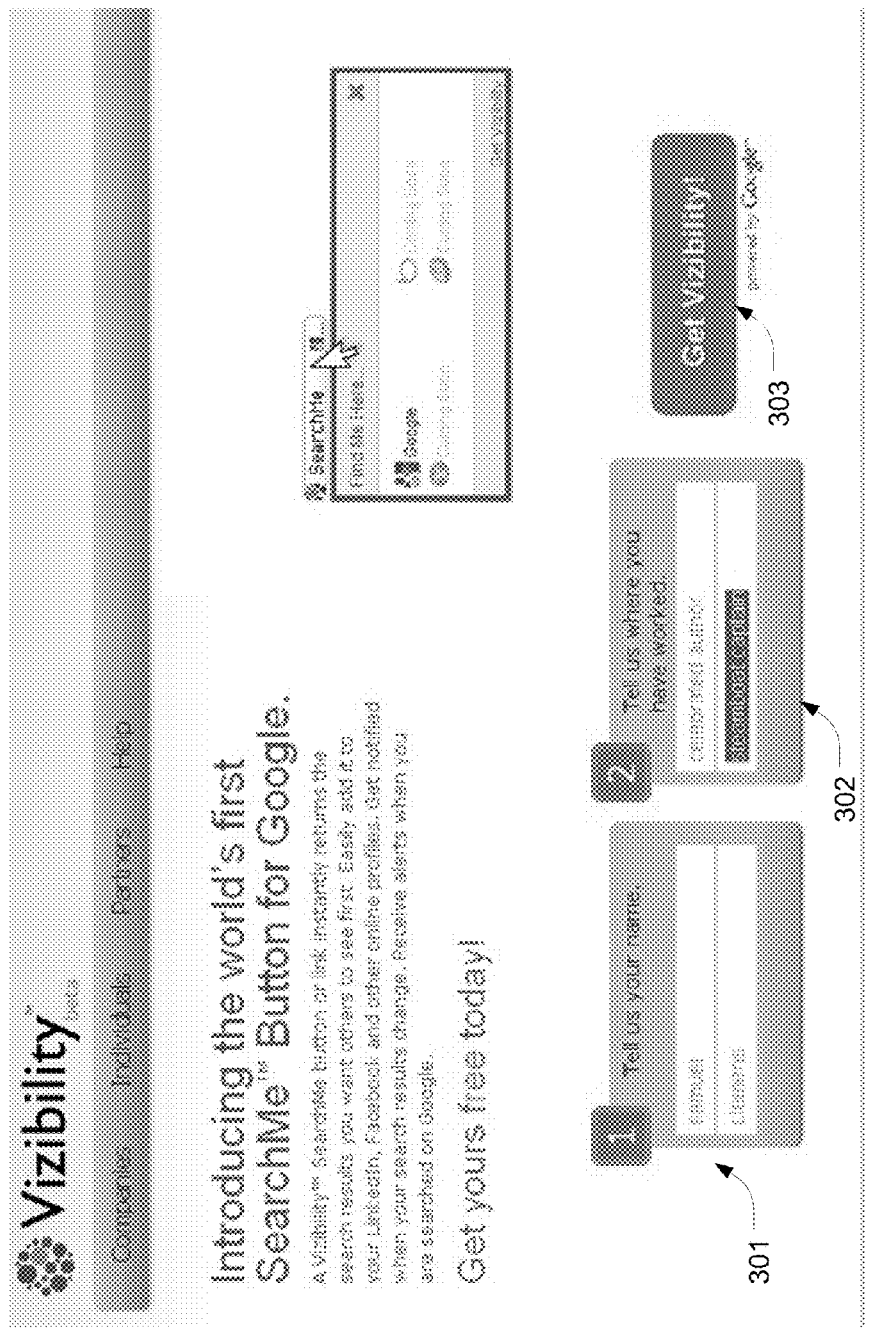
FIG. 5 depicts an interface example for gathering data to be used in query formation.

FIG. 4 depicts an example of process 213 that can be performed by a machine to help a user select a set of verified search results, which can be associated with a URL, or otherwise made available through various distribution channels, typically in conjunction with an attempt by a third party to search for information about that user. The process of FIG. 4 is described with respect to example interface elements found in subsequent figures. The process depicted in FIG. 4 follows display (271) of a set of search results. Typically, this set of search results will relate to an entity creating a query that will be referenced by a short URL, as described above. FIG. 5 depicts an example of inputting basic information about a person (such as a name 301), and information about present and past employment (302), and then allowing a user to obtain the search results by activation a button (303).

Figure 6:
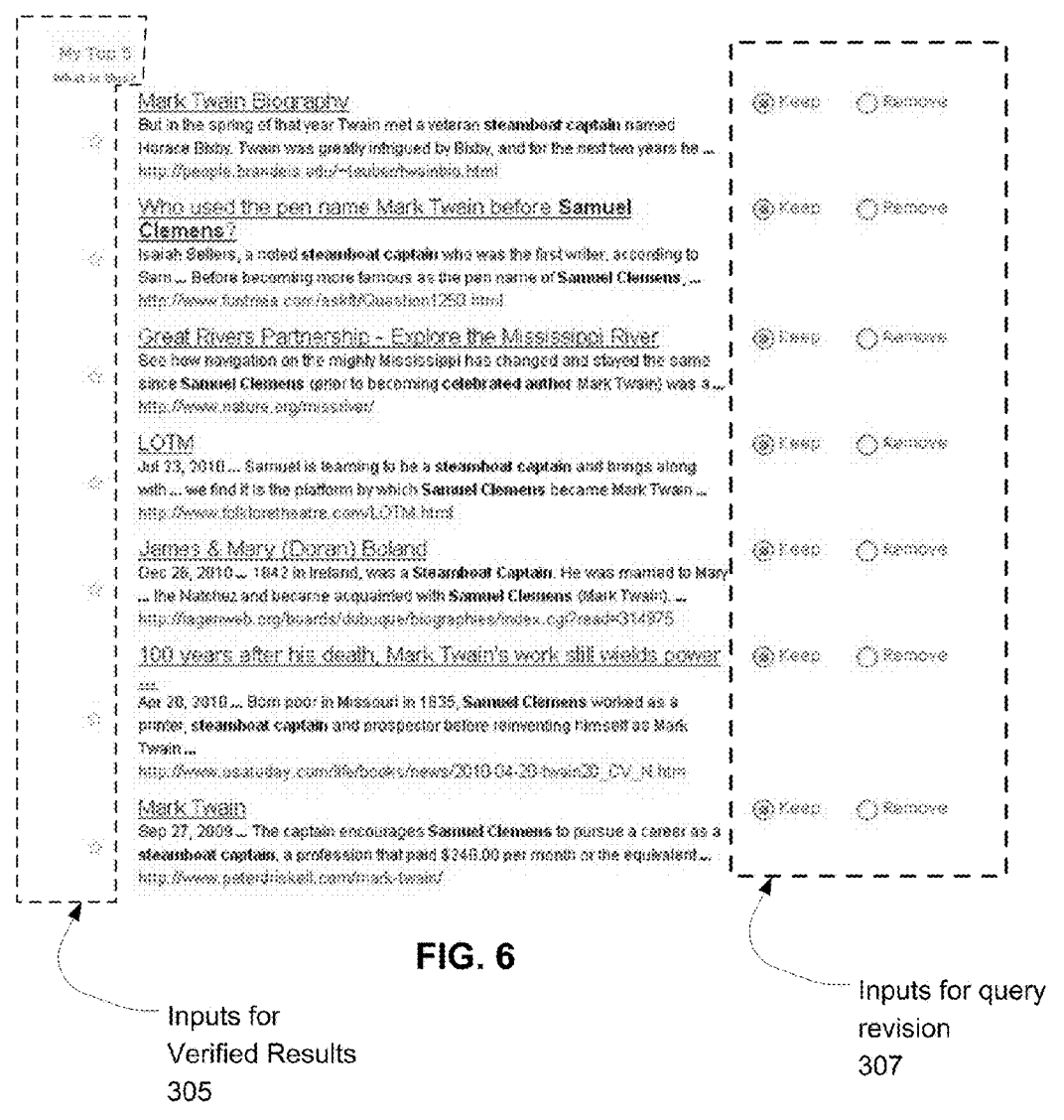

FIG. 6 depicts an example interface for displaying (271) such search results. One aspect of the depicted interface is a section 305 for receiving input for selecting results to be considered verified results. Also depicted is a section (307) for receiving inputs relating to query revision, which is not the principal subject of the present disclosure. As evident from FIG. 6, verified result input section (305) comprises a selectable indication (the star, in this example) (indication 306 identified), corresponding to each result presented on a given page.

Figures 7, 8:
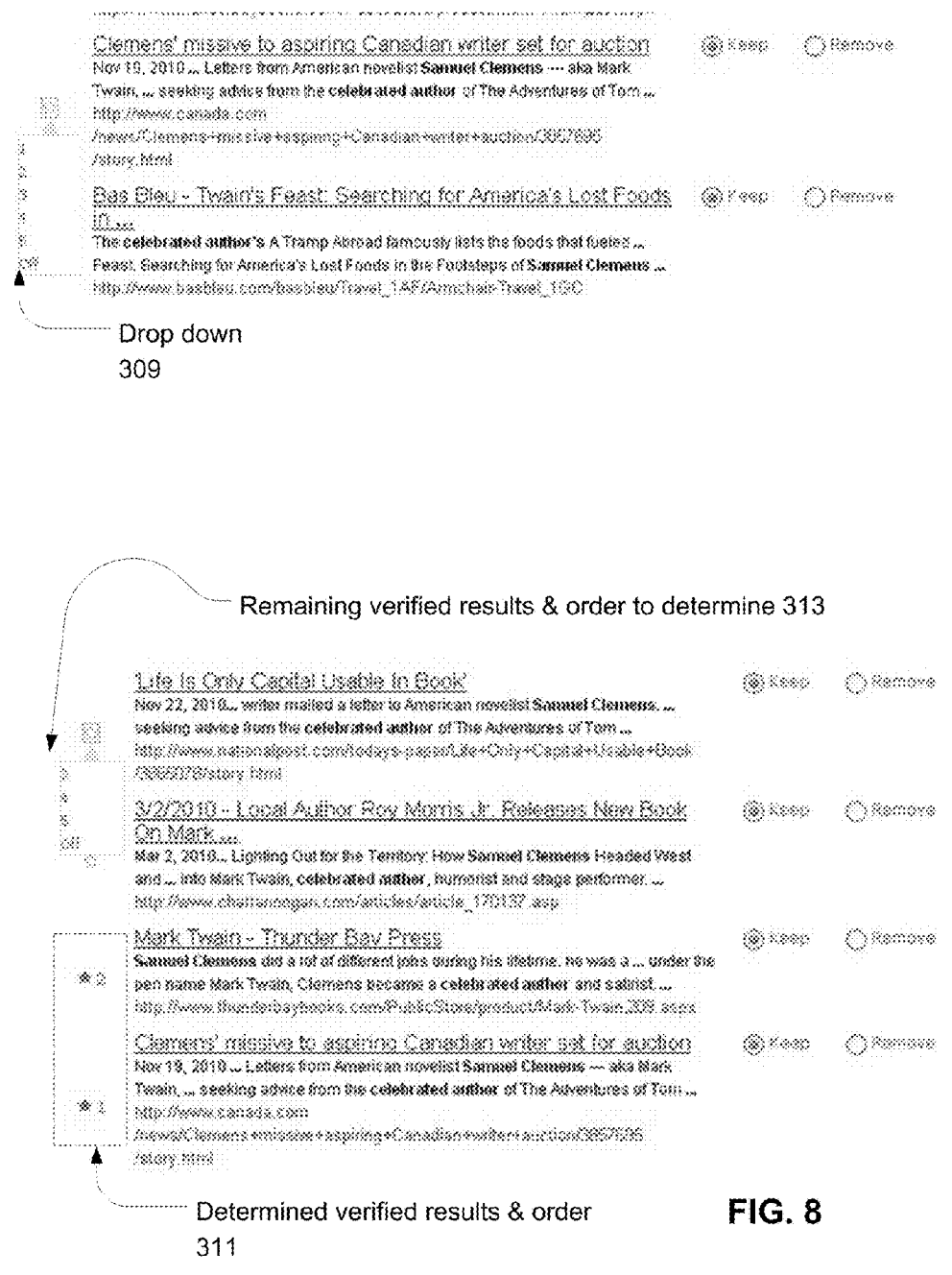

FIG. 7 depicts a system response to selection of an indication corresponding to a particular result. FIG. 7 depicts that a drop-down menu (309) enumerating a list of available slots (each slot corresponding to a verified result). Drop-down menu (309) also may comprise a selectable option to remove the result ("off"). In the example of FIG. 7, 5 slots are available, numbered 1-5, showing that in this example, a total of 5 verified results are available for selection. Of course, the number of verified results to be available for selection by a user can vary with the implementation, and no restriction on a number is required. For example, a user may be afforded an option to select how many verified results to present.

Referring to FIG. 4, drop-down menu (309) performs display (272) of an enumeration of available slots for a (predetermined) number of verified results, and display (274) of an option to add a specified search result, and input a relative ordering therefor. Also, a number of pages of available search results can be provided for display (276), as exemplified in FIG. 9, where a page of search results, and an index 315 of the pages of available results also is presented.

System 110 can receive input indicating a selection of a particular slot for the selected search result (277). Responsive to receiving such information, system 110 stores information for the search result; in one example, system 110 stores the entirety of the information displayed as the search result in results storage 111. System 110 also stores (281) metadata indicating the selected relative order for this result. System 110 also can update (285) an enumeration of remaining available slots in the verified results list.

FIG. 8 depicts that responsive to receiving such a selection of a result as a verified result (which in the drop-down implementation here, also necessarily involves selecting a relative order for that verified result), system 110, the next time it receives input activating a selectable indication (e.g., 305), system 110 enumerates only the remaining available slots. In particular, FIG. 8 depicts that responsive to selecting the indication associated with the link entitled, "Life is Only Capital . . . ", system 110 provides a listing of remaining available positions in the verified search results: positions 3, 4, and 5. The search results also can display information about which of the search results already have been selected as favorites; FIG. 8 depicts that the results (311) entitled "Mark Twain—Thunder" and "Clemens' missive . . . " have been selected as the number 2 and number 1 verified search results, respectively. The updated (285) information about available slots can be retrieved from the data store (111) and used to produce the UI output depicted in FIG. 8.

Also, in an example, after each search result is selected, a determination as to whether all slots in the set of verified results have been selected can be made (287), and if there still are more slots, then a further determination as to whether more search results are available also can be made (289). If there are more slots and more search results from which verified results may be selected, then the process can return to display a group or list of remaining (e.g., not yet reviewed) search results from which verified results may be selected, as explained above. If further input indicative of a selection of another search result as a verified result is received, then the process elements described above can be repeated for that selected search result.

Figure 9:
FIG. 9 depicts an example interface in which all verified results have been selected, the interface depicting a relative ordering of the results.

FIG. 9 depicts an example user interface subsequent to determining all of the verified search results (where a limit of 5 has been selected). In the user interface of FIG. 9, a number indicative of a relative order within the verified search results (and inherently, also indicative of selection as a verified result) is displayed (314) by each selected search result (causing such selected search results to be treated as verified results).

Returning to the process flow of FIG. 8, if it was determined that all slots were filled (287), then rather than continue to display available search results for further verified result selection, the process can end (291). However, the user interface can continue to remain displayed, and allow selection of pages of results for display, as evidenced in FIG. 9. In particular, FIG. 9 includes a list (315) of pages of search results available for display, which allow switching among pages of search results returned from search engine (130). Additionally, the interface can also include a selector (316) for a verified results page, which allows display of an ordered list of the verified results picked at a point when that selector (316) is selected, by input through the interface.

FIG. 9 also depicts an interface element by which a particular search result or content element can be included in verified search results. In particular, an exemplary link, entitled "missing results?" can be provided, selection of which responsively causes an add content 317 interface to be displayed. The reception and processing of such a specified input can be handled by decision (293), in which such specified input can be received for storage, a relative ordering provided, and available slots remaining updated (as shown by looping to process portion 281). Otherwise, if no such input is received, then the process can end (291). An example of such an interface is provided in FIG. 10, and described below.

A still further option for inputting verified search results that can be made available through an interface is inputting of a specified URL, indicative of content, that was not returned by search engine 130 responsive to the query that was submitted. Such a feature allows explicit inclusion of content that may be relevant to understanding one or more aspects of a background about a particular entity (e.g., a person, company, organization, etc.), but the algorithm supporting return of search results by search engine 130 has not identified such content as relevant enough to include in returned search results.

Figure 10:
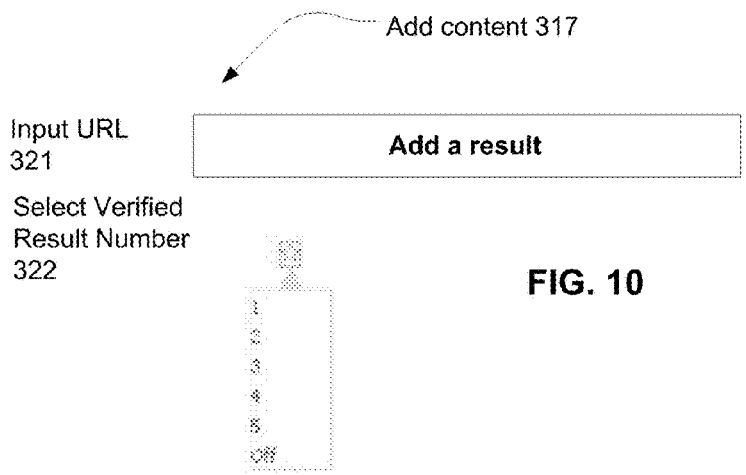
FIG. 10 depicts that an interface for verified results input also can include an element for allowing freeform URL input, to identify a particular result not returned by the search engine.

As an example implementation of such a feature, FIG. 10 depicts that an add content interface 317 provides for a URL to be inputted (321) and an interface element (322) to specify a relative order among the verified results to assign to the result represented by the inputted URL. In this example, element (322) can be the same type of drop-down allowing selection of a particular number from any number not already assigned, as explained above. In another example, the inputted result can simply be assigned to a next available slot, or a last available slot, or any other behavior, such as putting the added result in the first position and pushing the remaining previously selected results down a position in the ordering, such that a result that was in the number 5 position would be removed from the verified results list. These actions can be accounted for in the process depicted in and an interface element for explicitly assigning such a number is not required.

Returning to process portion 287 of FIG. 4, if all slots are filled (287), input can be received (288) to de-select certain previously-selected results. If such input is received, then the process can loop back to receive further selection of results to be maintained as verified results (277). Of course, it may be considered desirable to fill all available slots for a specified number of verified search results; however, processes according to these example disclosures do not need to require filling all such slots. Rather, a further ability to end verified results selection at any time can be provided. Further variations of such example disclosures are within the ability of those of ordinary skill, in view of these disclosures.

Figure 11:
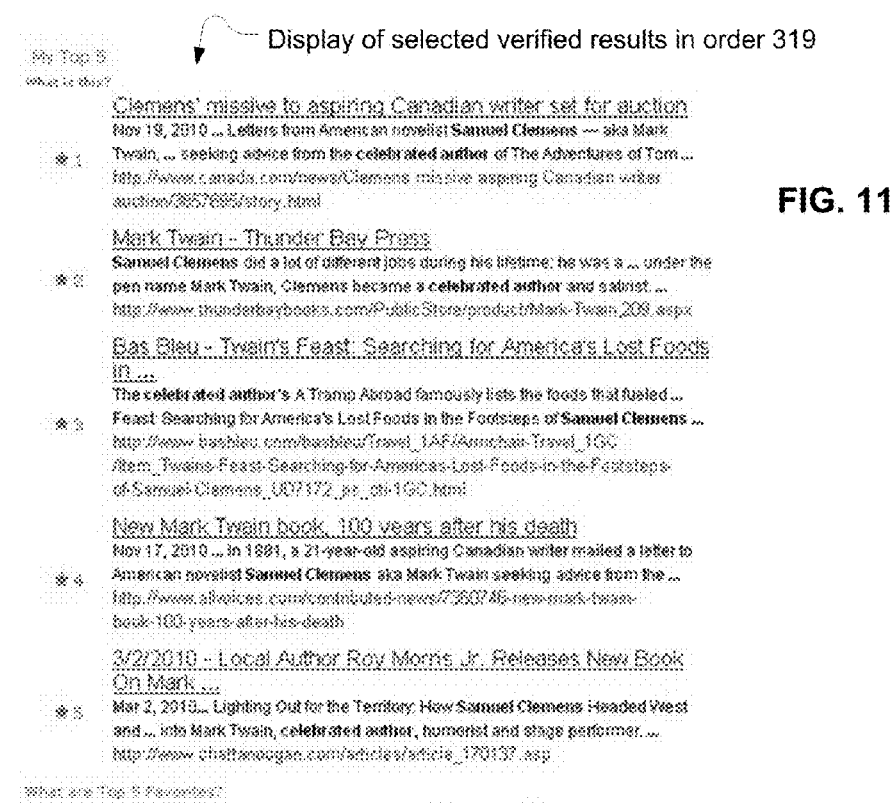
FIG. 11 depicts that a user interface element can be provided that lists the verified search results in order, such page can be made accessible as depicted and described.

FIG. 11 depicts an example interface that can be displayed responsive to input indicative of selection of selector (316), such interface includes, for example, a display of selected verified results in list order (319). For example, even though verified result number 5 may have been selected temporally before result 1 or result 2, the listing of verified results will relatively order the results into the order assigned through the interface (e.g., as described with respect to FIGS. 7-9. The now-familiar interface elements allowing inclusion and relative ordering of the verified results also allow changes in the relative order from this interface, by again clicking those elements, as described above. From here, by selecting the "off" option (see, e.g., FIG. 10), the result associated with that selection would be removed, and the process of FIG. 4 can again be run to allow inclusion of a search result to replace the one that was removed.

The interface element depicted in FIG. 11 can be displayed prior to completion of the process depicted in FIG. 4, in confirmation. After such confirmation (for example), the verified results selection and the query definition can be considered final, and a publication process for the URL that will reference both the query and the verified search results can be performed. In implementations according to these disclosures, a service that provides for one or more of the definition of a pre-defined query, and selection of verified search results can assist also in query publication, such as by assisting with creation of QR codes embodying the URL, linking to partnering web sites, and so on. However, a user also can be provided the URL, and the user can provide or otherwise make the URL available, and as such, also can be involved in such publication. Therefore, these examples are not to be considered as requiring participation in URL publication by any particular entity.

Figure 12:
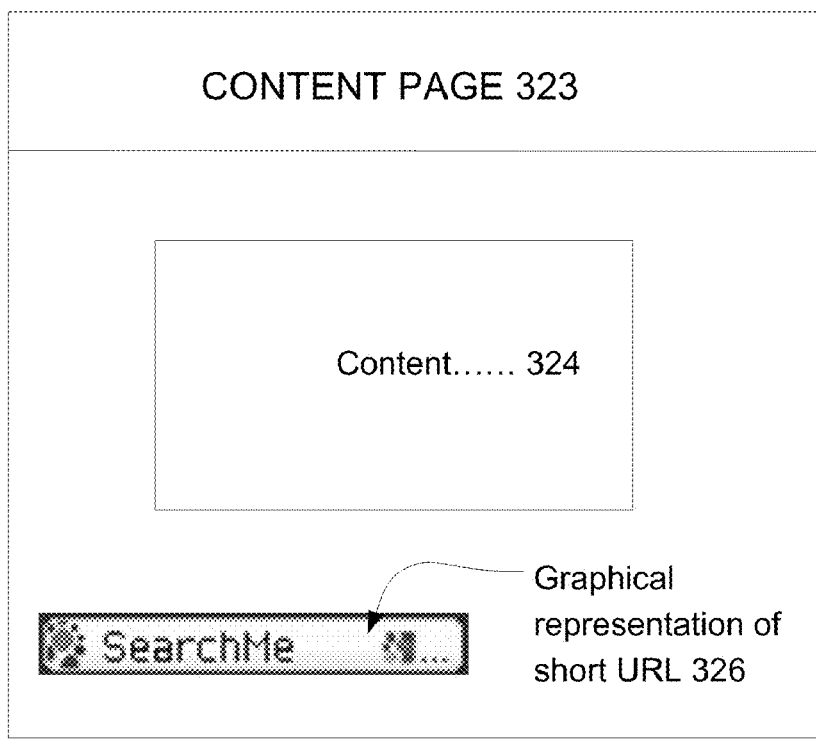
FIG. 12 depicts that a graphical representation or interface button can be provided on content page.

FIG. 12 depicts an example content page 323 that includes a graphical representation (326) of the now-published URL in conjunction with content 324, the selection of which representation 326 causes the display of the verified search results, as explained below with respect to exemplary interfaces. Another graphical representation includes accessing the URL through a quick response (QR) code placed on a business card, resume, brochure, PowerPoint presentation, etc. An example of using a QR code 550 to convey the URL (and optionally, additional information) described herein, is presented with respect to FIG. 20.

FIG. 20 depicts an example of usage of QR code 550 on a business card; however, such code can be used on any tangible medium, such as a resume, billboard, or advertisement. Such QR code 550 also can be provided for rendering on a display, such as a display of a cell phone, laptop, tablet, and so on.

Figure 13:
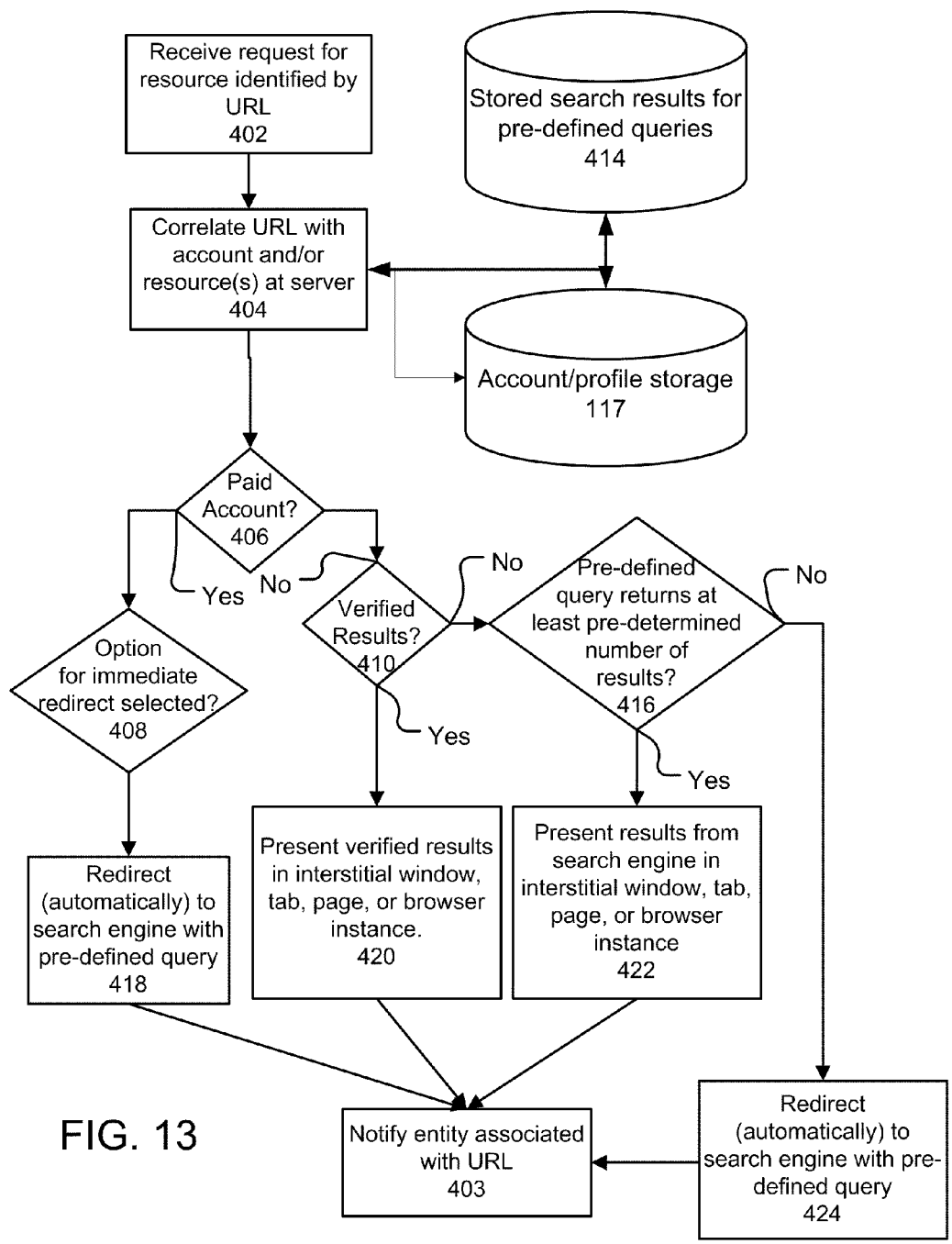
FIG. 13 depicts an example process for serving verified search results responsive to requests for such results.

FIG. 13 depicts a process performed in response to selection or activation of representation 326 or 550 (QR code). The exemplary process comprises receiving (402) a request for a resource identified by a URL, and correlating (404) that URL with an account or a resource. Such receiving (402) and correlating (404) can be performed by link server 119 and account server 118 (FIG. 1), and can include accessing storage 117 for obtaining account and/or profile information correlated to the URL. The verified search results can be stored in storage 414 (or in any other suitable storage, which allows adequate responsiveness in retrieval responsive to such requests).

In some instances, enabling a user to show verified results can be provided as a premium feature and in other instances, having the ability turn it off can be provided as a premium feature. Alternatively, the association of a paid subscription can be a basis for providing selected search results, and not performing an immediate redirect. As such, the functionality of presenting pre-selected search results can be made a premium feature, or a feature that is required for trial subscriptions.

By way of example, the process of FIG. 13 can include determining (406) whether the account so correlated with the URL is a paid account or a free account. If the account is a paid account, then an option (408) may allow for direct retrieval and presentation of search results from the search engine using the pre-defined query associated with the URL (418). The search results can be live or previously stored. However, if the account is not a paid account, or if the option to immediately present all search results is not selected (for a paid account), then a determination (410) as to whether there are search result verified can be made. If there are verified results in storage (e.g., in storage 414), then those results are presented (420) in an interstitial window (for example), or a new tab, page, or browser, as explained with respect to FIGS. 14 and 15.

If the option for immediate redirect is not selected (or not available, in some examples), then the method can proceed to a determination (410) as to whether verified results exist. In sum, the alternate paths from paid account determination (406) can be reversed, and where an immediate redirect is not a desired account option (or is not allowed), then the method can proceed to determining availability of verified results and the ensuing portions of the example process.

Figure 16:
FIG. 16 depicts that optionally live search results can be returned, even if verified search results were selected.

If there are no verified results in storage, then a determination (416) concerning how many search results are returned responsive to using the pre-defined URL in a live search is made. If there are at least a pre-determined minimum number of results, then those results are presented (422) in an interstitial window, tab, page or browser instance. These results can be differentiated by identifying them as search results, rather than verified search results, for example. However, if a number of results returned for the search is not at least such minimum number, then the request can be redirected (424) to the search engine, so that the available search results are displayed within a window associated with the search engine, as depicted in FIG. 16. A user associated with the URL can be notified (403) of the URL usage at the conclusion or during processes according to these disclosures.

FIG. 14 shows a content page 329, which would, in typical usage scenarios, be displayed on a web browser of an entity activating the short URL (e.g. a person searching for information about the user who defined the query and selected the verified search results). The verified search results can then be displayed in verified results interstitial 330. Such interstitial 330 also can include a link 333 to go to a live display of search results in the search engine. FIG. 15 depicts an example where such verified search results can be displayed in a new tab 331, rather than in an interstitial that blocks a current view of the page that was being viewed.

Referencing FIGS. 20-24, an example of using a QR code (such as QR code 550 depicted in FIG. 20) to convey URL information, and effect transfer of other data is explained.

In particular, usage of a camera on a mobile device to capture and interpret QR 550 can result in decoding of the URL that was encoded. This URL can be used to obtain the resource referenced by such URL, which can include a page, such as the example page depicted in FIG. 21. Such page can include a button 551 to obtain all search results, which functions as described with respect to button 333 depicted in FIG. 14, for example. Another button that can be provided is an "add contact" button 552, which allows contact information relating to the entity (e.g., person) identified by the URL to be retrieved and displayed, as shown by example in FIG. 22, with contact information 555. The action of emailing such vcard to the email provided a way to add the contact information to a contacts manager application on the device, as shown with respect to contact information 556 depicted in FIG. 23.

Figure 19:
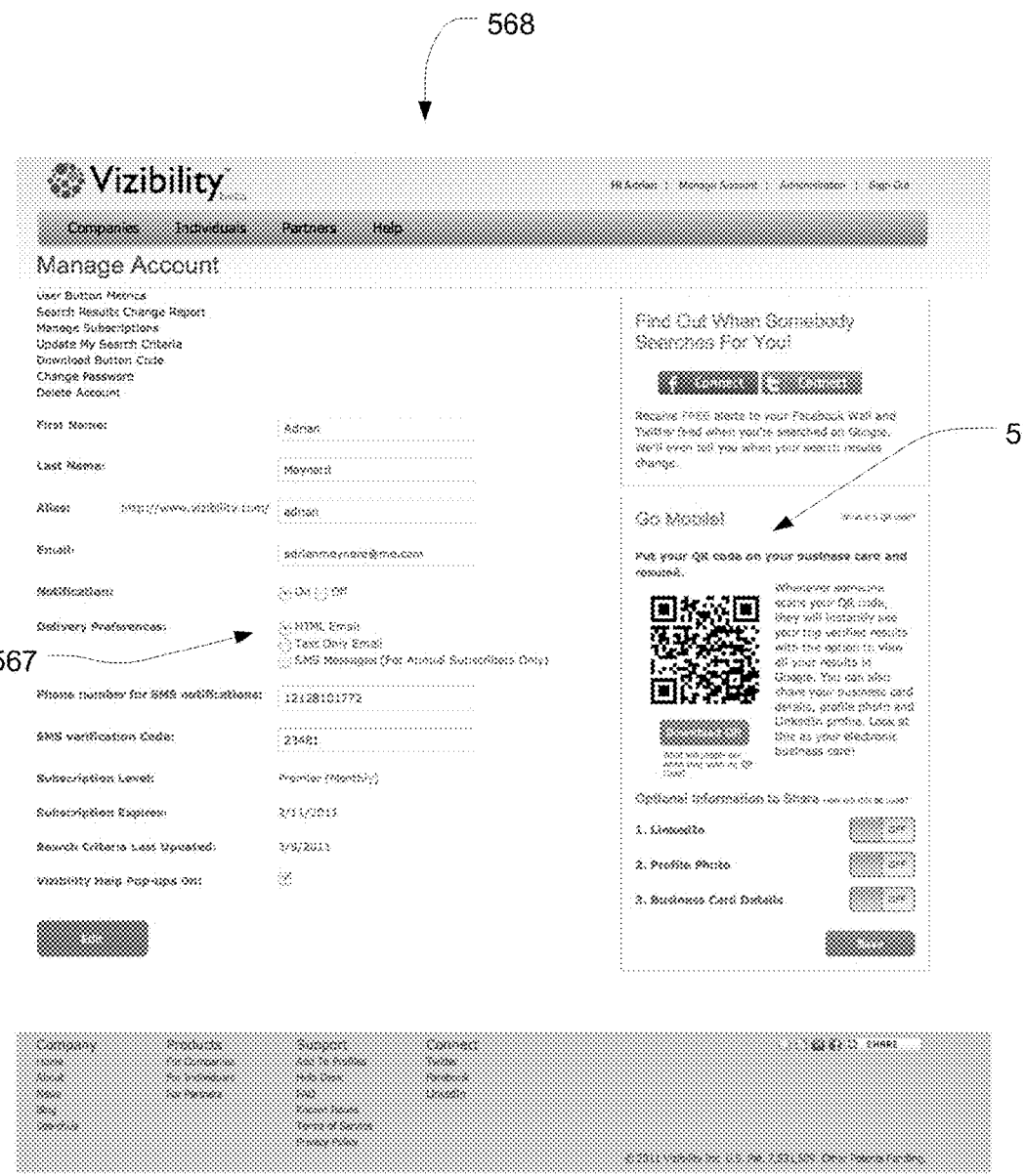
FIG. 19 depicts an account management interface element.

FIG. 19 depicts an account management interface 568, which can be used to obtain and revise contact information 567. Such contact information also can include an option whether such contact information is to be made available, and under which circumstances. A further functionality that can be provided in such an interface 568 is specification of information to be included in a QR code 570 that will be then made available for use on tangible objects, and other usages according to the examples herein.

Figure 24:
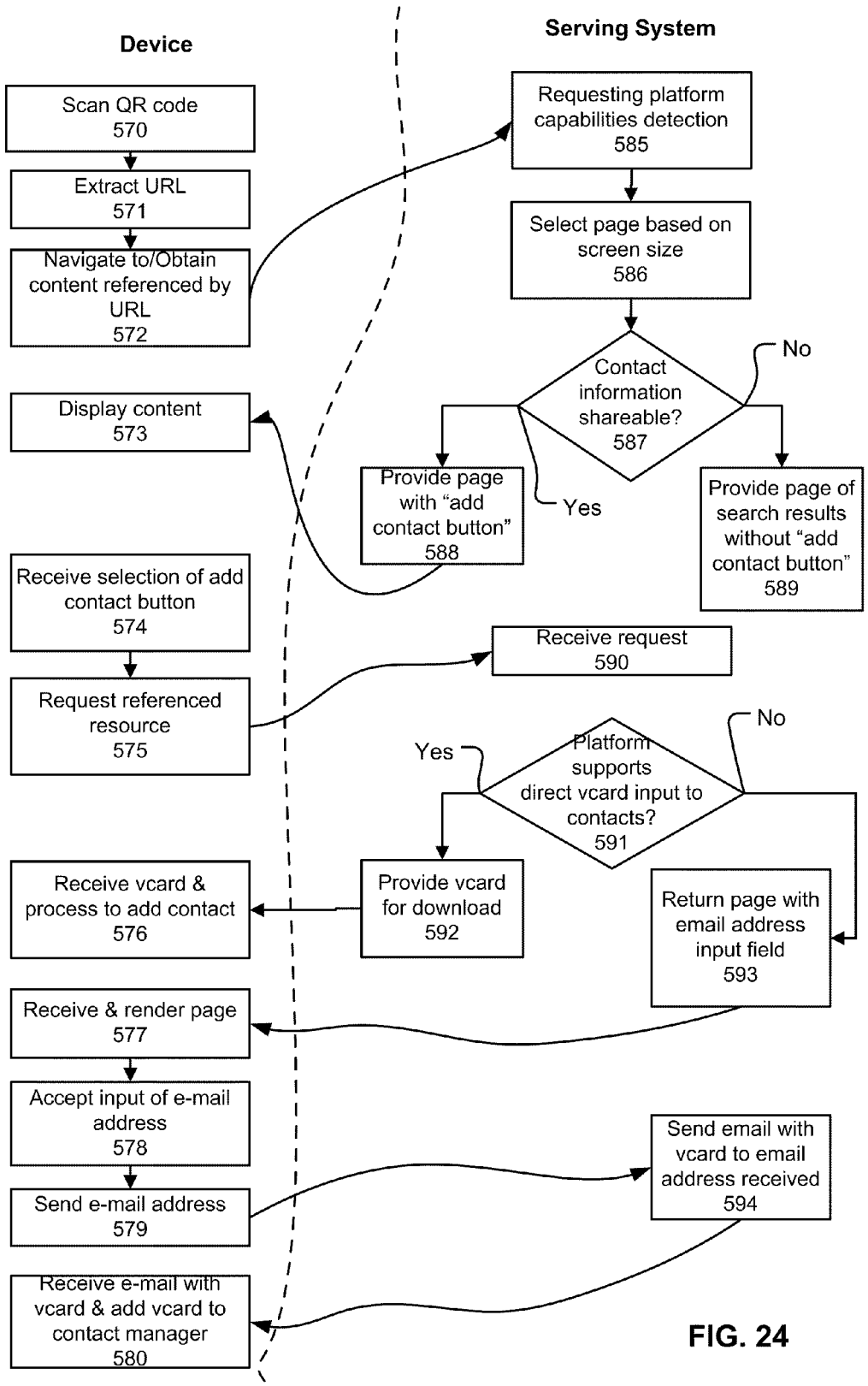
FIG. 24 depicts an interaction between a device requesting verified search results, such as through a URL retrieved from a QR code, and a platform serving such results.

FIG. 24 depicts an example interaction in which a device, such as a device with browser 126 of FIG. 1 that can scan a QR code, and a platform for serving requests for verified search results and so on (such as system 110). The method of FIG. 24 is described with respect to FIGS. 21-23, which depict example user interfaces that can be displayed on requesting devices.

Such exemplary method includes scanning (570) a QR code (e.g., from a business card) using a camera or other input available on the device in question. The QR code is interpreted according to relevant standards, and a URL encoded therein is extracted (571), and used to obtain or navigate (572) to a resource referenced by the URL.

Upon receiving a request for the URL, a capability detection of capabilities of the requesting platform can be performed (585). For example, detection of a browser type and version can be performed. A browser type detected can be used as a proxy for determining whether the requesting device is a mobile device, and a page appropriate for a smaller or larger screen size can be responsively selected (586). Based identifying an account or entity associated with the URL, a determination whether contact information is shareable (e.g., available, and settings allow sharing) is performed (587).

If contact information is shareable, then a page that includes search results and also includes an "add contact" button is provided (588), as exemplified in FIG. 21, with add contact button 552, and if contact information is not shareable, then a page (not separately depicted) with search results but without such button is provided (589). The page provided (588 or 589) is returned to be rendered on the requesting device. Such page is displayed (573) on the requesting device. Where the page includes the "add contact" button, an input indicative of selection of such button can be received (574), and that button can then result in a request (575) for the resource referenced by the button. The resource referenced can itself vary based on capabilities of the device making the request. A request for such resource is received (590) at the serving device, and a determination (591) whether the requesting device supports direct download of a contact file is made.

If the requesting device supports such direct contact file download (e.g., in a vcard format), then the vcard file is provided for download. For example, an existing platform that supports direct download of vcard files, and import into a contact manager are mobile devices based on the Android® operating system, which is available from Google Inc. The device then receives and processes (576) the contact file (exemplary vcard file), resulting in the addition of the received contact information to a contact manager for the device. However, if the device cannot support direct download and importation of a contact file, then a page of content is returned (593) to the device. An example of such a page 555 is depicted in FIG. 22, wherein contact information that would be made available can be shown, along with a field 556 to enter an e-mail address. The entry (578) of an email address, and subsequent sending (579) of the e-mail address allows a response of sending (594) of an e-mail addressed to the provided e-mail address, where that e-mail includes a file, or more generally the contact information and associated metadata in a format that can be processed (580), resulting in the import of the contact information into the contact manager for the device. FIG. 24 depicts a specific example of using a vcard file format. However, embodiments according to this description are not limited to such format, in that a person of ordinary skill, from these examples, would be able to device a variety of approaches to provision of such contact information, and descriptor information about the contact information to allow a contact manager to import such information.

The method depicted in FIG. 24 depicts an approach where contact information is provided from a remote device, such as a server, in response to a request process from a device, such as a mobile device. However, other approaches within the scope of this description include encoding such contact information into the QR code (e.g., QR code 550) itself, along with interpretation information that identifies what the encoded information represents. If the QR code cannot include the entirety of the information, or if the QR code is desired to be kept under a certain size, then a selection of the contact information can be made, and the method of FIG. 24 can be invoked for contact information not included in the QR code. For example, an e-mail address, and main contact telephone number can be included, while physical address information can be made available through methods according to the example method of FIG. 24.

FIG. 16 depicts an example of live search results 338 using the pre-defined query that was associated with the URL ("Samuel Clemens" and "celebrated author"), and the search results that come back. This interface depiction can be displayed responsive to determinations (406, 308 FIG. 13), or determination (416), as well as selection of link 333 in FIG. 14, for example and as explained above.

Figure 17:
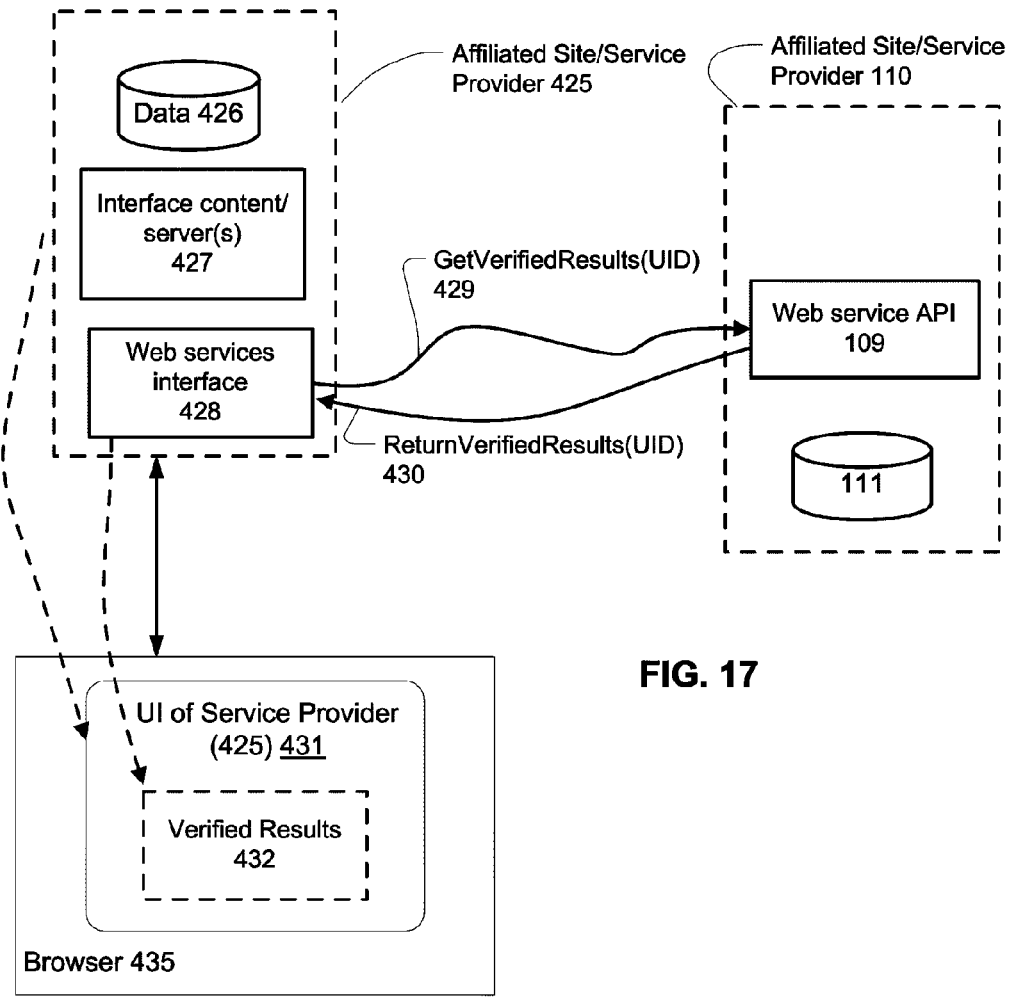
FIG. 17 depicts an approach where provision of verified search results can be made through a web service.

FIG. 17 depicts another approach to presentation of verified search results. In the example of FIG. 17, instead of, or in addition to a link that allows activation of a URL and retrieval of verified search results, a web service can be provided for retrieval and display of verified search results on a content page. Such an implementation may be relevant, for example, where an affiliated site or service provider 425 has content pages associated with particular entities or users (e.g., people or businesses). In such a situation, affiliated service provider 425 can have its own interface and content server(s) 427 and associated data storage (426). These servers and associated information provides for display of an interface 431 generated by affiliated service provider 425 in a browser 435 located on a device that is accessing content from provider 425. An web services API call can be embedded in the page of content being rendered in browser 435. The API call can be a "GetVerifiedResults" API call (429), which specifies a particular user identifier, such as a unique user name or e-mail address. The user name or e-mail address is determined based on an association with the page of content being rendered; for example, a profile page associated with a particular person would cause the GetVerified Results API call (429) to use an e-mail address or user ID associated with that profile page. Such information can be obtained when the user associated with that profile page signed up with affiliated service provider 425. Responsive to call 429, verified results can be returned (430) to affiliated service provider 425, for inclusion in the page. Alternatively, those results can be directly populated into the UI being rendered in browser 435, and in such an implementation, the Get request (429) can originate from browser 435. Within system 110 (for verified search results selection and provision), web service API 109 (see FIG. 1) is implemented.

Figure 18:
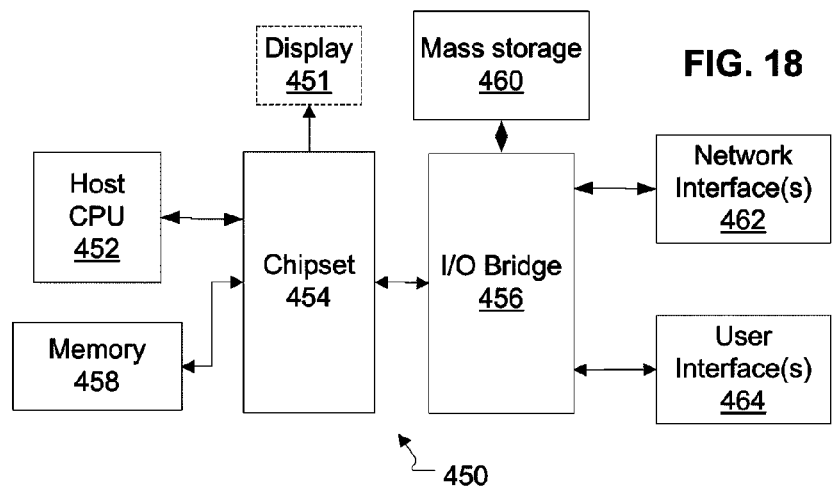
FIG. 18 depicts example constituent components of devices that can implement processes or portions thereof, according to these disclosures.

FIG. 18 depicts an example of a computer system 450 that can be used to implement described structural elements, such as the structural elements depicted in FIG. 1. By particular example, a computer system according to the example computer system 450 can be used in executing browsers 126 and 125, a number of such systems 450 can be employed at search engine 130, as well as at search query search query provider 110.

Example computer system 450 may include a host Central Processing Unit (CPU) (452), which may be implemented as a semiconductor containing one or more distinct microprocessor units, commonly called "cores", to indicate distinctness, but yet integration on a common substrate. Modern processors typically comprise multiple cores, such as 2, 4, 6, 8, 12 or more cores. Host CPU 452 also can be implemented with a plurality of physically separate microprocessor units, disposed in separate sockets. Host CPU 452 communicates with a chipset 454, which typically includes memory bus logic, and other interfaces to other functionality, such as an expansion bus for supporting I/O, such as network traffic to and from network interface(s) 462, mass storage 460 (e.g., hard drives), as well as peripherals, such as those that can be provided for a user interface (464). Example of such peripherals include a keyboard, serial I/O, a mouse, voice recognition inputs, touch screen inputs, and so on.

Chipset 454 also may support connection of a display 451, and therefore may include graphics logic for rendering content to be displayed. Such graphics logic may use main memory 458 as video memory, or a separate video memory may be provided. Where system 450 is used for implementing end-user computers, a display 451 is more likely to be included. Frequently, if system 450 is functioning as a server, a display would not be provided.

Of course, the example system 450 is provided by way of example and not limitation as to what kinds of devices may be used in implementing aspects disclosed herein. Those of ordinary skill in the art may adapt the disclosures presented herein for use with a variety of devices, such as smartphones, tablet computers, laptops, and so on, which may be implemented using components that are more or less integrated than those depicted herein, and which may include more functionality or fewer functions than what is depicted in this example.

More generally, unless specified otherwise, the example methods depicted in the figures do not imply a requirement of ordering of steps, aside from the depicted responsiveness to events, and other predicate conditions. As such, methods within the scope of this description include methods that perform such steps in a different order, omit steps, or include other steps or actions not depicted in the examples. For example, with respect to FIG. 3, search results can be stored before or after a URL is provided. For example, a short URL can be selected in advance, even before a query that ultimately will be referenced by the URL is finalized. A variety of such variations would be within the scope of those of ordinary skill, in view of these disclosures. Similarly, the example structures shown that may implement such methods and other aspects imply no exclusion as to structures or apparatus or systems that may perform such methods. Such methods also may be performed jointly by multiple machines, each handling a portion of a method according to the examples. These options are themselves merely examples why the subject matter of the claims is to be limited solely by the full scope of the claims appended hereto.

I claim:

1. A method, comprising:
   identifying a resource identified by a network address, via a processor of a server and in response to receiving a request from a remote machine, the resource comprising a listing of verified search results associated with the network address;
   wherein a user associated with the network address makes a selection of at least one search result from search results received from a search engine in response to a pre-defined search query, the selection causing the at least one search result to be a verified search result,
   wherein the selection is facilitated by a user interface comprising:
      indicia indicating the selection of a specific result, wherein the specific result is assigned a relative order within the listing of verified search results within a user-defined range, and wherein the specific result is assigned to a location within the user-defined range,
      a list of search results, and
      a selector for a consolidated view of the verified search results which allows display of the listing of the verified search results, and
   wherein the relative order of the verified search results is arrangeable by the user;
   retrieving the resource; and
   sending to the remote machine the listing of the verified search results arranged according to the relative order.

2. The method of claim 1, further comprising sending a notification to the user upon receiving the request.

3. The method of claim 1, further comprising sending to the remote machine a link to the pre-defined search query associated with the search results from which the verified results were selected, wherein activation of the link at the remote machine directs the remote machine to a current set of search results returned by the search engine responsive to the pre-defined query.

* * * * *